(12) United States Patent
Nakayama et al.

(10) Patent No.: US 12,432,457 B2
(45) Date of Patent: Sep. 30, 2025

(54) IMAGE CAPTURING APPARATUS AND CONTROL METHOD THEREOF AND STORAGE MEDIUM

(71) Applicant: CANON KABUSHIKI KAISHA, Tokyo (JP)

(72) Inventors: Fumitaka Nakayama, Kanagawa (JP); Hiroshi Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 18/065,019

(22) Filed: Dec. 13, 2022

(65) Prior Publication Data
US 2023/0199319 A1   Jun. 22, 2023

(30) Foreign Application Priority Data
Dec. 17, 2021   (JP) ................. 2021-205464

(51) Int. Cl.
*H04N 23/72* (2023.01)
*H04N 5/265* (2006.01)
*H04N 23/71* (2023.01)
*H04N 23/73* (2023.01)
*H04N 23/76* (2023.01)
*H04N 25/131* (2023.01)

(52) U.S. Cl.
CPC ............. *H04N 23/72* (2023.01); *H04N 5/265* (2013.01); *H04N 23/71* (2023.01); *H04N 23/73* (2023.01); *H04N 23/76* (2023.01); *H04N 25/131* (2023.01)

(58) Field of Classification Search
None
See application file for complete search history.

(56) References Cited

U.S. PATENT DOCUMENTS

| | | | |
|---|---|---|---|
| 2018/0336664 A1* | 11/2018 | Ono | H04N 23/45 |
| 2020/0053297 A1* | 2/2020 | Tokizaki | H04N 23/60 |
| 2021/0165144 A1* | 6/2021 | Yamazaki | H04N 25/62 |

FOREIGN PATENT DOCUMENTS

JP   11-308609 A   11/1999

* cited by examiner

*Primary Examiner* — Christopher Braniff
(74) *Attorney, Agent, or Firm* — Cowan, Liebowitz & Latman, P.C.

(57) ABSTRACT

An image capturing apparatus comprises a determination unit configured to determine an exposure in order to capture a visible light image and an invisible light image; an image capturing unit configured to capture a visible light image and a plurality of invisible light images with an exposure determined by the determination unit; a synthesis unit configured to synthesize the plurality of invisible light images and generate a synthetic invisible light image; and a correction unit configured to correct the visible light image using the synthetic invisible light image.

16 Claims, 10 Drawing Sheets

VISIBLE LIGHT IMAGE

INFRARED LIGHT IMAGE

FIG. 2A

| R | G | R | G |
|---|---|---|---|
| IR | B | IR | B |
| R | G | R | G |
| IR | B | IR | B |

VISIBLE
+
INFRARED LIGHT FILTER

FIG. 2B

| R | G | R | G |
|---|---|---|---|
| G | B | G | B |
| R | G | R | G |
| G | B | G | B |

VISIBLE LIGHT FILTER

FIG. 2C

| IR | IR | IR | IR |
|---|---|---|---|
| IR | IR | IR | IR |
| IR | IR | IR | IR |
| IR | IR | IR | IR |

INFRARED LIGHT FILTER

VISIBLE LIGHT IMAGE

INFRARED LIGHT IMAGE

INFRARED LIGHT IMAGE
EXPOSURE -1 LEVEL

INFRARED LIGHT IMAGE
EXPOSURE -2 LEVEL

IMAGE CAPTURING APPARATUS AND CONTROL METHOD THEREOF AND STORAGE MEDIUM

BACKGROUND OF THE INVENTION

Field of the Invention

The present invention relates to a technique for correcting a visible light image using an invisible light image.

Description of the Related Art

Conventionally, images captured in visible light may have low contrast or poor visibility. In a case of, for example, capturing of a distant mountain view in visible light, fog or haze may prevent information that gives a person an impression of unevenness of the mountain view from being sufficiently captured, and thus the capturing may be such that it gives a person a flat and dull impression with a low contrast. In addition, image capturing under a low illumination intensity such as in a dark place may be of a reduced visibility.

On the other hand, in comparison with visible light images, by using an invisible light (infrared light) image, capturing of information that gives a person an uneven impression of the mountain view and capturing of a high visibility image under low illumination intensity can be enabled. Therefore, a technique has been proposed that uses an infrared light image to correct a visible light image and improve its visibility.

Japanese Patent Laid-Open No. 11-308609 discloses a technique for improving the visibility by detecting a region with a low visibility in a visible light image and synthesizing the region with an infrared light image.

However, there is a difference in spectral characteristics between visible light and infrared light, and thus brightness between a visible light image and an infrared light image may differ when the infrared light image is captured under an exposure condition determined based on the visible light. An attempt in such a case to adjust the brightness of the infrared light image to match the brightness of the visible light image may generate a high degree of noise in the infrared light image, or may fail to acquire information required for correction due to saturation.

SUMMARY OF THE INVENTION

The present invention, which has been made in consideration of the foregoing problems, provides an image capturing apparatus that allows for appropriately correcting a visible light image using an invisible light image.

According to a first aspect of the present invention, there is provided an image capturing apparatus comprising: at least one processor or circuit configured to function as: a determination unit configured to determine an exposure in order to capture a visible light image and an invisible light image; an image capturing unit configured to capture a visible light image and a plurality of invisible light images with an exposure determined by the determination unit; a synthesis unit configured to synthesize the plurality of invisible light images and generate a synthetic invisible light image; and a correction unit configured to correct the visible light image using the synthetic invisible light image.

According to a second aspect of the present invention, there is provided a method of controlling an image capturing apparatus comprising: determining an exposure in order to capture a visible light image and an invisible light image; capturing a visible light image and a plurality of invisible light images with an exposure determined in the determining; synthesizing the plurality of invisible light images and generating a synthetic invisible light image; and correcting the visible light image using the synthetic invisible light image.

According to a third aspect of the present invention, there is provided a non-transitory computer-readable storage medium storing a program for causing a computer to function as respective units of an image capturing apparatus, the image capturing apparatus comprising: a determination unit configured to determine an exposure in order to capture a visible light image and an invisible light image; an image capturing unit configured to capture a visible light image and a plurality of invisible light images with an exposure determined by the determination unit; a synthesis unit configured to synthesize the plurality of invisible light images and generate a synthetic invisible light image; and a correction unit configured to correct the visible light image using the synthetic invisible light image.

Further features of the present invention will become apparent from the following description of exemplary embodiments with reference to the attached drawings.

BRIEF DESCRIPTION OF THE DRAWINGS

FIGS. 2A to 2C are diagrams respectively illustrating a filter used in an image capturing unit according to the first embodiment;

DESCRIPTION OF THE EMBODIMENTS

Figure 1A:
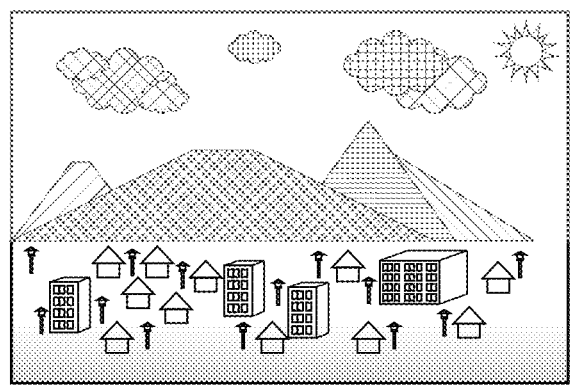
FIGS. 1A and 1B are diagrams respectively illustrating an example of a visible light image and an example of an infrared light image according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The present invention relates to a technique for correcting a visible light image using an invisible light image, and the present embodiment describes a case where brightness of an infrared light image as an invisible light image is darker than brightness of a visible light image.

Figure 1B:
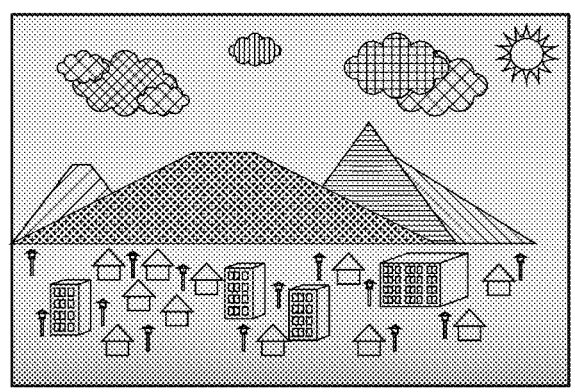

For example, as illustrated in FIG. 1A, a visible light image may have low contrast due to the effect of fog or haze. On the other hand, as illustrated in FIG. 1B, an infrared light image captured under the same exposure condition as the visible light image may be a dark image while contrast of the infrared light image is higher than the visible light image. In addition, there will be described a case in the present embodiment where an image capturing unit configured to acquire visible light images and infrared light images has a filter configuration in which red (R), green (G) and blue (B) color filters configured to capture a visible light image, and IR filters configured to capture an infrared light image are regularly arranged, as illustrated in FIG. 2A.

Figure 3:
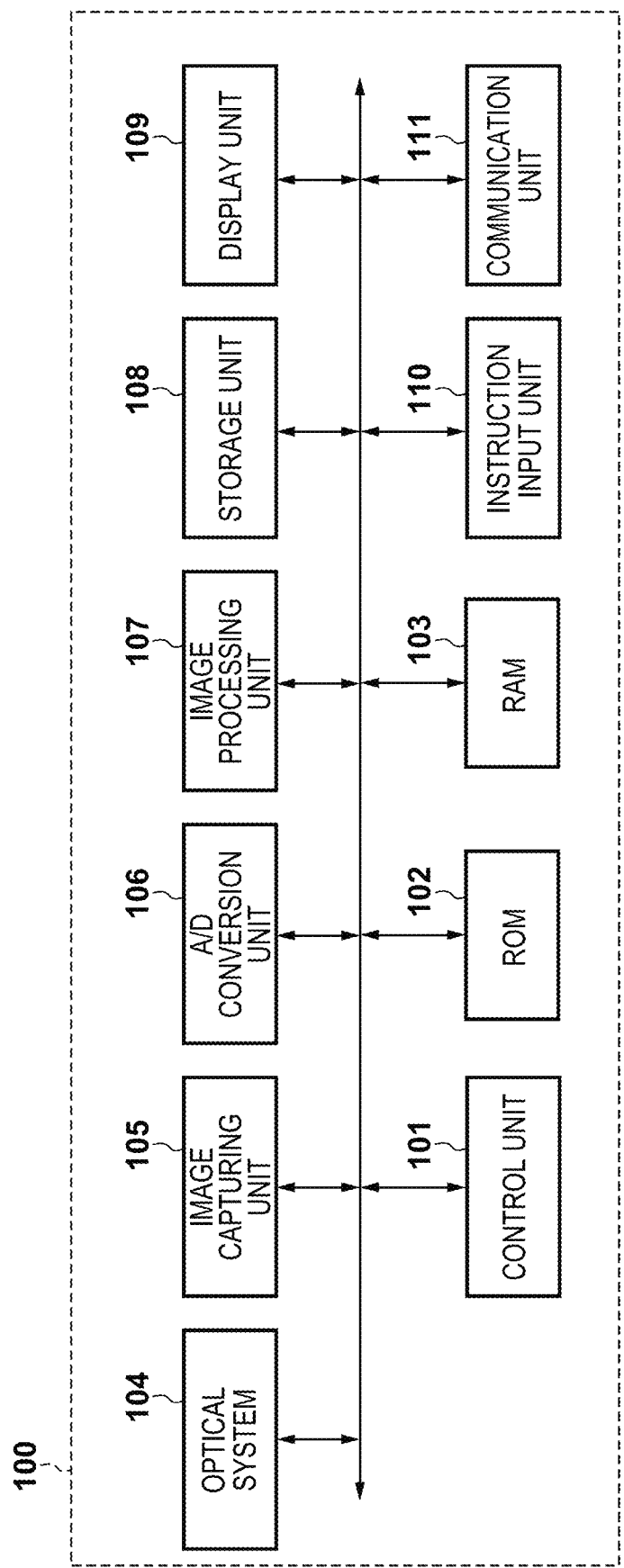
FIG. 3 is a diagram illustrating an image capturing apparatus according to the first embodiment.

FIG. 3 is a block diagram illustrating a configuration of an image capturing apparatus according to a first embodiment of the present invention.

In FIG. 3, a control unit 101, which is a CPU for example, reads out a controlling program for each block included in an image capturing apparatus 100 from a ROM 102, deploys the program in a RAM 103 described below, and executes the program. In this way, the control unit 101 controls the operation of each block included in the image capturing apparatus 100.

The ROM 102, which is an electrically erasable and recordable non-volatile memory, stores parameters or the like required for operating each block, in addition to the operation program of each block included in the image capturing apparatus 100.

The RAM 103, which is a rewritable volatile memory, is used for deploying a program to be executed by the control unit 101, temporarily storing data generated in the operation of each block included in the image capturing apparatus 100, or the like.

An optical system 104, which is formed of a lens group including a zoom lens and a focus lens, forms a subject image on an imaging surface of an image capturing element arranged in the image capturing unit 105.

The image capturing unit 105 includes, for example, an image capturing element such as a CCD or a CMOS sensor, performs photoelectric conversion of an optical image formed on the imaging surface of the image capturing element by the optical system 104, and outputs the obtained analog image signal to an A/D conversion unit 106.

The A/D conversion unit 106 converts the input analog image signal into digital image data. The digital image data output from the A/D conversion unit 106 is temporarily stored in the RAM 103.

An image processing unit 107 performs various image processing on the image data stored in the RAM 103. Specifically, various image processing for developing, displaying and recording the digital image data such as, for example, correction processing of pixel defect due to the optical system 104 or image capturing elements, demosaicing processing, white balance correction processing, color interpolation processing, gamma processing are executed.

A storage unit 108 records data including image data into a recording medium integrated therein. A display unit 109, including a display device such as an LCD, displays an image recorded in the RAM 103 or an image recorded in the storage unit 108 on the display device. In addition, the display unit 109 also displays a user interface for accepting an instruction from a user, or the like.

An instruction input unit 110, which is an input interface including various physical operation members such as a touch panel or a shutter button, accepts instructions input by the user. A communication unit 111 wirelessly connects to an external server, exchanges data including image data or arrangement information described below. The external server includes, for example, a server that manages a service such as a social network service (to be called SNS in the following) that transmits captured images and publish them to SNS viewers.

In addition, under control by the control unit 101, the image capturing apparatus 100 performs live-view display, in which analog image signals sequentially output from the image capturing unit 105 are sequentially displayed to the display device via the A/D conversion unit 106, the RAM 103, the image processing unit 107, and the display unit 109. In performing live-view display, it is possible to, determine a composition for the actual capturing in consideration of recording of the image data into the recording medium, or make preparation for actual capturing, that is for example, changing exposure conditions such as aperture or shutter speed, or changing image processing conditions in order to change the image quality such as brightness, gradations or tint.

Figure 4:
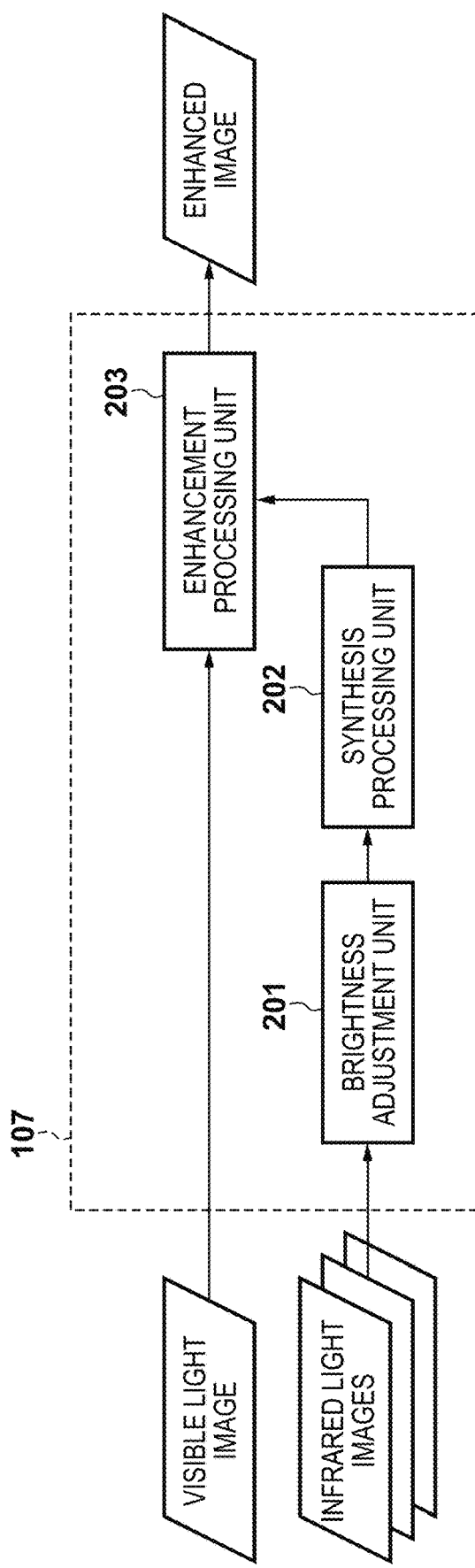
FIG. 4 is a diagram illustrating a configuration of an image processing unit according to the first embodiment.

Next, FIG. 4 is a block diagram illustrating a configuration of the image processing unit 107.

In FIG. 4, the image processing unit 107 includes a brightness adjustment unit 201 configured to adjust the brightness of an infrared light image, a synthesis processing unit 202 configured to synthesize a plurality of infrared light images subjected to brightness adjustment and generate a synthetic infrared light image (synthetic invisible light image), and an enhancement processing unit 203 configured to perform an enhancement process on the visible light image using the synthetic infrared light image.

Figure 5:
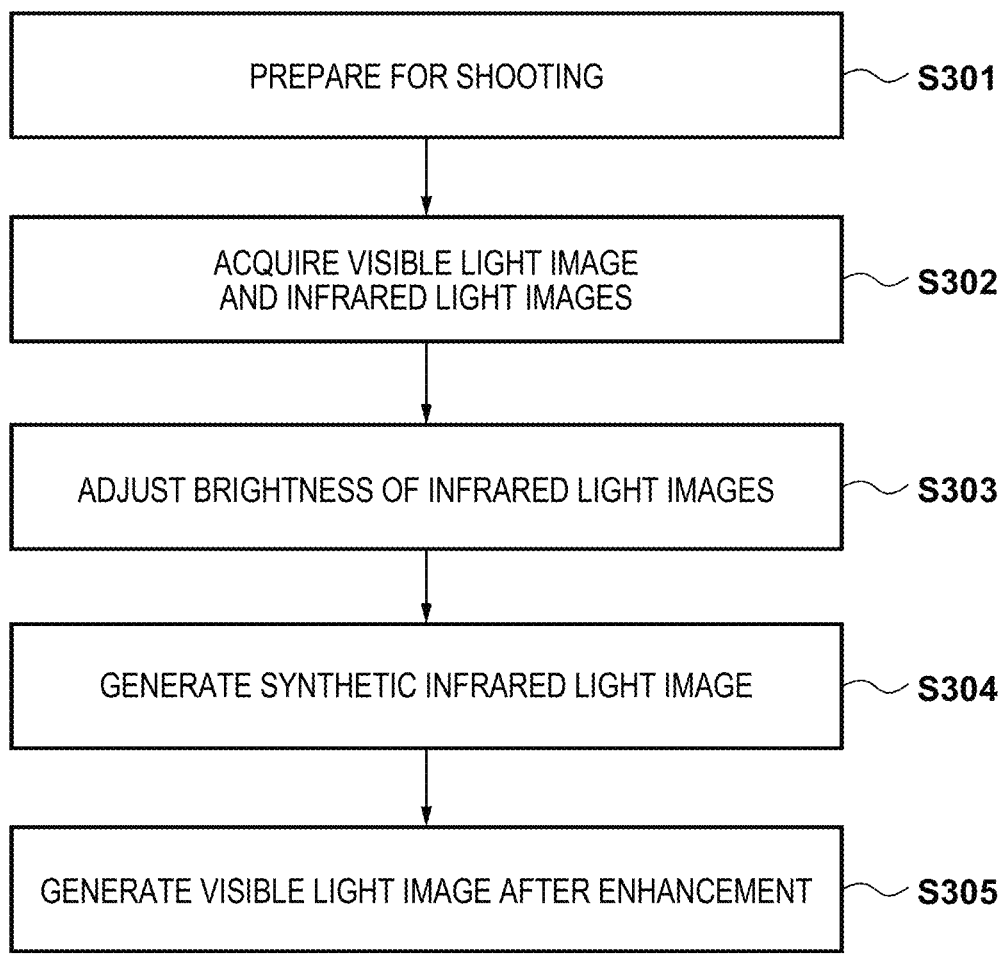
FIG. 5 is a flowchart illustrating a process flow of the image capturing apparatus according to the first embodiment.

FIG. 5 is a flowchart illustrating a process flow of an image capturing apparatus 100 according to the present embodiment. Each step of the flowchart is executed by each block of the image capturing apparatus 100 in accordance with an instruction from the control unit 101.

Upon the user activating the image capturing apparatus 100, the control unit 101 controls, at step S301, the optical system 104, the image capturing unit 105, the A/D conversion unit 106, the RAM 103, the image processing unit 107, and the display unit 109 to start live view display. During the live view display, the image capturing apparatus 100 captures and sequentially acquires live images, and displays the acquired live images on the display device of the display unit 109. The user can determine the composition while checking the live images being sequentially displayed, or change the exposure condition, the image processing condition and the like.

At step S301, the control unit 101 determines the exposure condition of a visible light image to be captured and also evaluates brightness of an infrared light image under the same exposure condition, and then determines number of infrared light images to be captured, which will be required at subsequent stages, and a coefficient for brightness adjustment. The present embodiment assumes a case where an infrared light image is darker than a visible light image, and therefore multiplying the coefficient for the brightness adjustment is performed at a later stage in order to match the brightness of the infrared light image (synthetic infrared light image) with the visible light image. However, noise will increase as multiplication by the coefficient is performed, and therefore capturing and synthesizing a plurality of infrared light images are performed to suppress the noise. In a case where the brightness of the infrared light image is evaluated and compared with the brightness of the visible light image, for example, and when the brightness of the infrared light image is darker by one level, the number of infrared light images to be captured is set to 2, and the coefficient for brightness adjustment is set to 2. In addition, when the brightness of the infrared light image is darker by two levels, the number of infrared light images to be captured is set to 4, and the coefficient for brightness adjustment is set to 4. In other words, the number of infrared light images to be captured is determined such that the noise amount in the synthetic infrared light image becomes comparable to the noise amount in the visible light image.

At step S302, the control unit 101 uses the image capturing unit 105 to acquire a visible light image based on the exposure condition determined at step S301, and a plurality of infrared light images based on the exposure condition and the number of images to be captured determined at step S301.

At step S303, the control unit 101 uses the brightness adjustment unit 201 to adjust the brightness of the infrared light images based on the brightness adjustment coefficient determined at step S301. When, for example, the coefficient for brightness adjustment is 2, each of the plurality of infrared light images acquired at step S302 is multiplied by a coefficient 2 to adjust the brightness.

At step S304, the control unit 101 uses the synthesis processing unit 202 to synthesize the plurality of infrared light images subjected to brightness adjustment at step S303, and generate a synthetic infrared light image. When, for example, there are two infrared light images subjected to brightness adjustment at step S303, a synthetic infrared light image is generated by calculating the arithmetic mean of the two images. In this way, it becomes possible to generate a synthetic infrared light image having a high contrast while suppressing increase of noise.

Although detailed description is omitted here, the plurality of infrared light images may be aligned using known techniques before calculating the arithmetic mean. The present embodiment uses a filter such as that illustrated in FIG. 2A, and therefore the visible light image and the first infrared light image are captured at a same time. On the other hand, since the second and subsequent infrared light images are captured at different time points, the subject position may shift. Therefore, the position of the subject may be adjusted by aligning with the first infrared light image as the reference.

At step S305, the control unit 101 uses the enhancement processing unit 203 to perform an enhancement process (correction process) on the captured visible light image based on the synthetic infrared light image generated at step S304.

Figure 6:
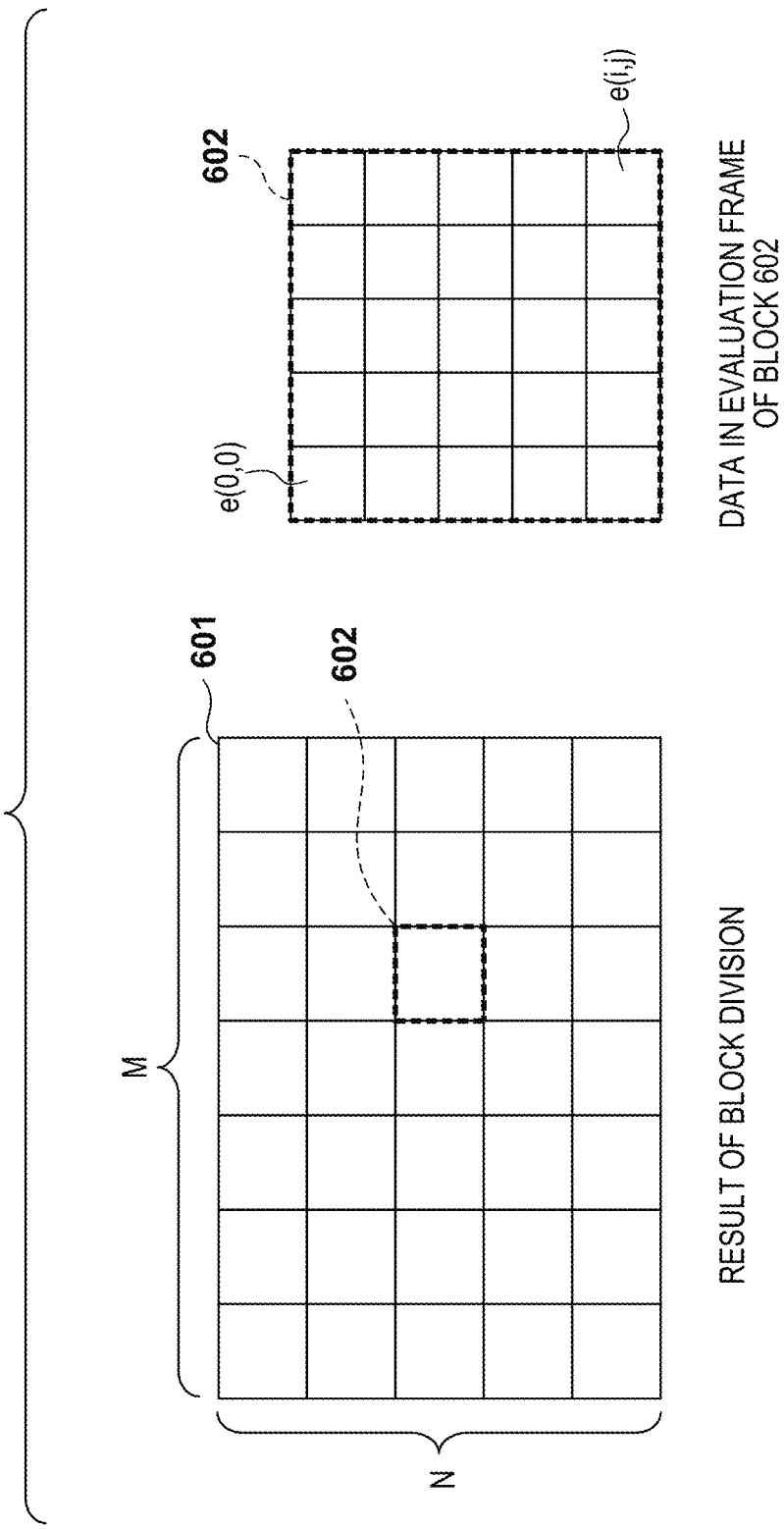
FIG. 6 is a diagram illustrating an example of block division according to the first embodiment.

At this step, gradation information is first calculated for the visible light image and the synthetic infrared light image. Edge intensity characteristics in the subject is acquired as the gradation information. The edge intensity characteristics are acquired by detecting an edge signal by applying a bandpass filter to the image, and calculating an integral value of edge signals of an arbitrary block size. The calculated evaluation value grows larger for a larger integral value of the edge signals, i.e., a larger number of textures. A result of block division by an arbitrary block size into M×N blocks is illustrated in FIG. 6 with the reference numeral 601, and the evaluation value is calculated in the following equation (1), using the pixel values of a single block 602 among the blocks.

$$E = \Sigma i \Sigma j e(i,j) \quad (1)$$

e(i, j): Edge intensity value in each coordinate in an arbitrary block

E: integral value of edge intensity in an arbitrary block

The evaluation value E that is the gradation information is calculated for both the visible light image and the synthetic infrared light image, then the evaluation values are denoted Ecolor and Eir, respectively.

Next, a process for determining a region to be enhanced in the visible light image will be described. The region to be enhanced is determined using previously calculated gradation information. First, the gradation information of the visible light image and the synthetic infrared light image are compared. It is necessary to detect a region with less gradations in the visible light image and more gradations in the synthetic infrared light image as a region in which the visibility of the visible light image is desired to be improved. Therefore, a difference Diff is calculated as in equation (2) from the evaluation values Eir and Ecolor of the block located at a same position for which the gradation information is calculated.

$$\mathrm{Diff} = Eir - Ecolor \quad (2)$$

A set of blocks having a small evaluation value Ecolor of the visible light image and a difference Diff of the evaluation value being larger than a predetermined value is determined to be the region to be enhanced.

Figures 7A, 7B:
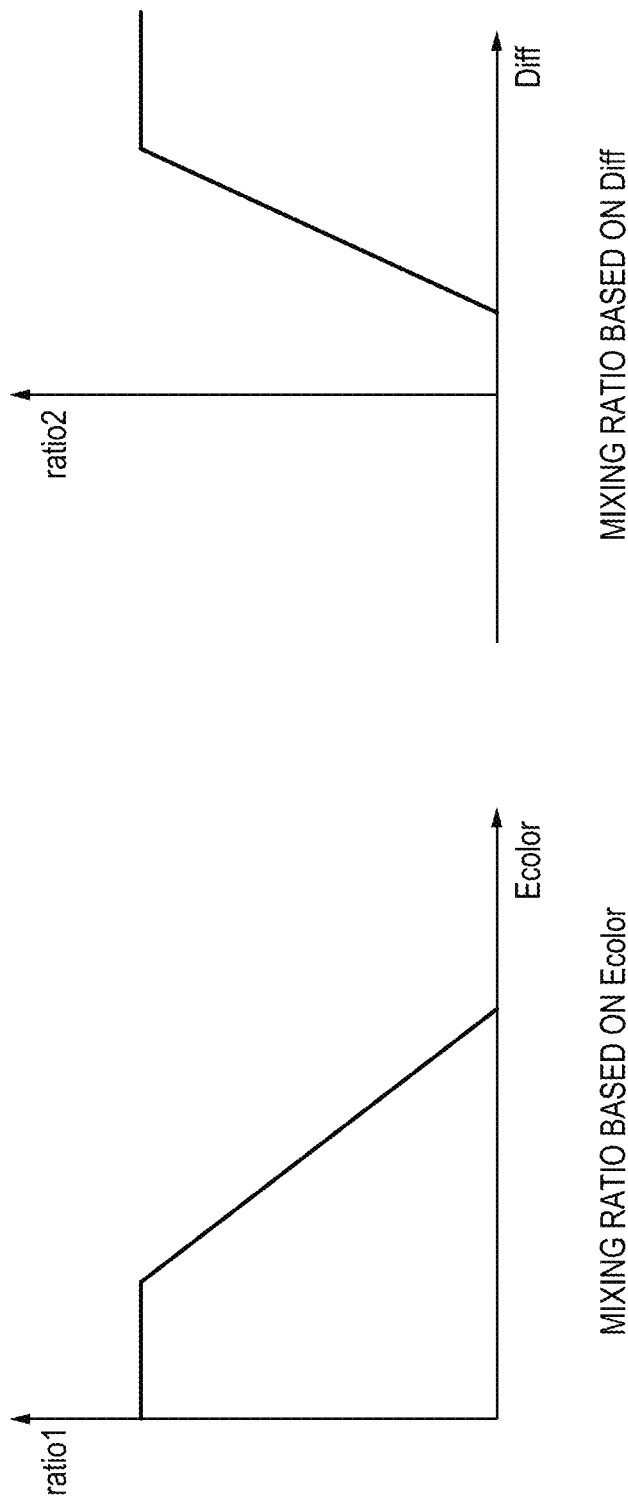
FIGS. 7A and 7B are diagrams respectively illustrating a degree of enhancement according to the first embodiment.

Next, a process for enhancing the visible light image will be described. In a previously determined enhancement region, the enhancement process is performed using FIGS. 7A and 7B, and the following equation (3). FIG. 7A illustrates a ratio of mixing the visible light image and the synthetic infrared light image, with respect to the evaluation value Ecolor of the visible light image. ratio1 indicates a mixing ratio of the synthetic infrared light image based on Ecolor, and the mixing ratio of the synthetic infrared light image is increased for a region having a small Ecolor, i.e., less gradations of the visible light image.

FIG. 7B illustrates a ratio of mixing the visible light image and the synthetic infrared light image, with respect to the difference Diff between the evaluation values of the visible light image and the synthetic infrared light image. ratio2 indicates a mixing ratio of the synthetic infrared light image based on Diff, and the ratio of the synthetic infrared light image is increased for a region having a larger Diff, i.e., more gradations of the synthetic infrared light image than that of the visible light image. The enhancement process is performed using the values of ratio1 and ratio2 together with equation (3) to generate an enhanced visible light image.

$$I'\mathrm{color} = (1-\mathrm{ratio1} \times \mathrm{ratio2}) \times I\mathrm{color} + \mathrm{ratio1} \times \mathrm{ratio2} \times Iir \quad (3)$$

ratio1: mixing ratio calculated from Ecolor
ratio2: mixing ratio calculated from Diff
Icolor: visible light image
Iir: synthetic infrared light image
I'color: Visible light image after enhancement As has been described above, the present embodiment allows for acquiring information of an infrared light image that can be used to perform an appropriate enhancement process on a visible light image, even when the infrared light image is darker than the visible light image, whereby it becomes possible to improve the contrast of the visible light image.

Here, evaluation of the brightness of the visible light image and the infrared light image at step S301 of the present embodiment may be performed on the entire image, or may be performed using a part of the image. As an example of using a part of the image, an enhancement region extracted at step S305 may be employed. In such a case, the gradation information calculation and the enhancement region determination performed at step S305 are performed at the preceding step S301, and the result of which is used for brightness evaluation.

In addition, although there has been described in the present embodiment a process of mixing, at step S305, the synthetic infrared light image with respect to a region with less gradations of the visible light image, the invention is not limited thereto, and an AC component extracted from the synthetic infrared light image may be mixed.

In addition, although a case of using the filter illustrated in FIG. 2A as the filter of the image capturing unit has been described in the present embodiment, the invention is not limited thereto, and image capturing may be performed by preparing a filter for the visible light image and a filter for the infrared light image as illustrated in FIGS. 2B and 2C, and switching these filters.

In addition, although the present embodiment uses gradation information of both the visible light image and the infrared light image when determining a region to be enhanced, the user may select the region to be enhanced.

In addition, the present embodiment uses, in the enhancement process, a plurality of captured infrared light images, and a synthetic infrared light image acquired by synthesizing the plurality of captured infrared light images, the both may be recorded together with a visible light image subjected to the enhancement process, or only the synthetic infrared light image may be recorded together with the visible light image subjected to the enhancement process.

Second Embodiment

In a first embodiment, a case has been described where the brightness of an infrared light image is darker than that of a visible light image. In a second embodiment, there will be descried a case where the infrared light image is partially saturated under the exposure condition based on the visible light image.

Here, same reference numerals as those in the first embodiment are intended to express similar operations or processes to those in the first embodiment, and therefore description thereof will be omitted. In addition, the configuration of the image capturing apparatus according to the second embodiment is similar to that of the first embodiment, and therefore description thereof will be omitted.

Figure 8:
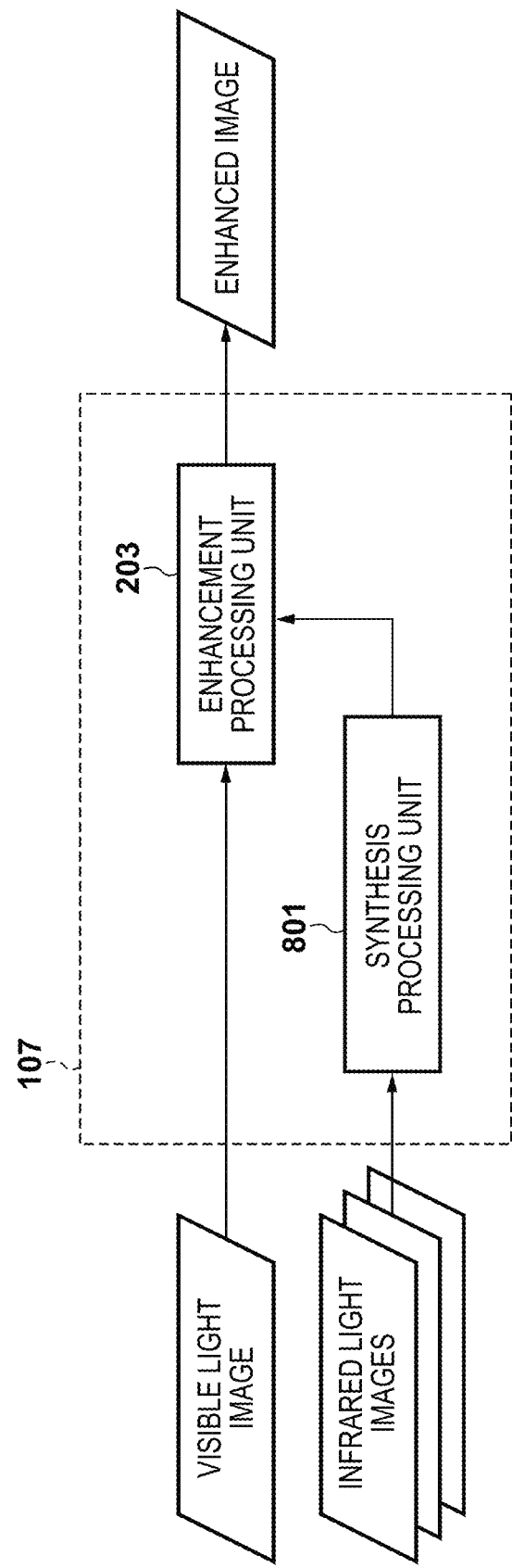
FIG. 8 is a diagram illustrating a configuration of an image processing unit according to a second embodiment.

FIG. 8 is a block diagram illustrating a configuration of an image processing unit 107.

In FIG. 8, the image processing unit 107 includes a synthesis processing unit 801 configured to synthesize a plurality of infrared light images with different exposures, and an enhancement processing unit 203 configured to perform an enhancement process on the visible light image using the synthetic infrared light image.

Figure 9:
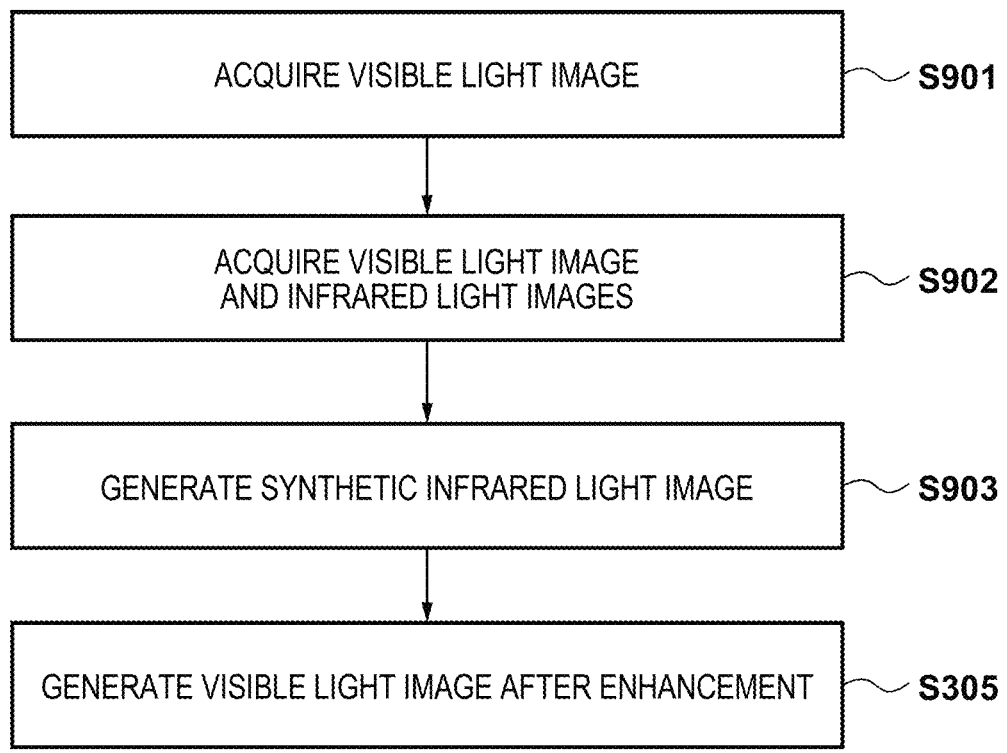
FIG. 9 is a flowchart illustrating a process flow of an image capturing apparatus according to the second embodiment.

FIG. 9 is a flowchart illustrating a process flow of the image capturing apparatus 100 according to the present embodiment. Each step of the flowchart is performed by each block of the image capturing apparatus 100 in accordance with an instruction from the control unit 101.

Figure 10A:
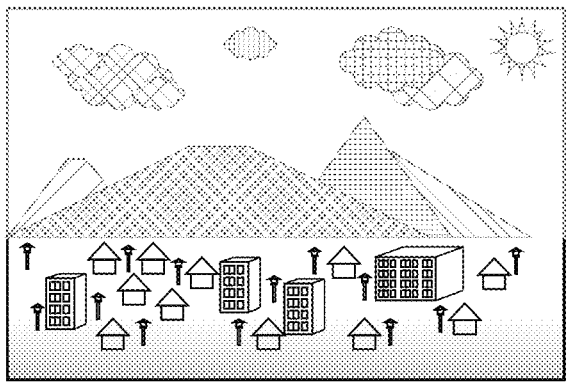
FIGS. 10A to 10D are diagrams respectively illustrating an example of a visible light image or an example of an infrared light image according to the second embodiment.
Figure 10B:
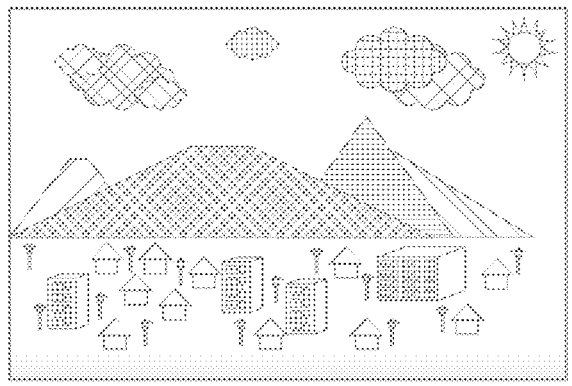

In a step S901, an exposure condition of a visible light image to be captured is determined and brightness of an infrared light image at the exposed condition is evaluated, similar to step S301 of FIG. 5. As illustrated in FIG. 10A, the visible light image has a low contrast similarly to the first embodiment. On the other hand, the infrared light image is partially saturated (to a predetermined degree or higher) as illustrated in FIG. 10B, from the image in such a state, it is difficult to acquire information for appropriately performing the enhancement process on the visible light image. In such a case, the control unit 101 controls to shorten the Tv (exposure time) at the subsequent step S902 to capture a plurality of infrared light images.

Figure 10C:
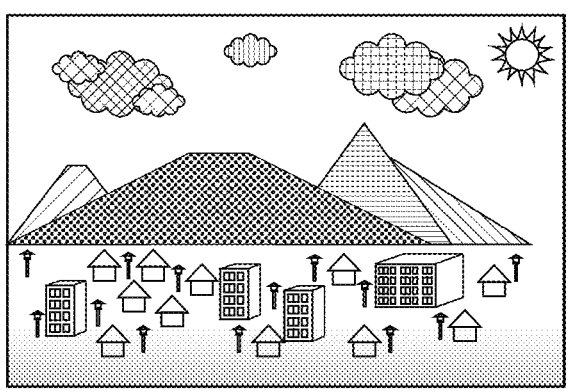
Figure 10D:
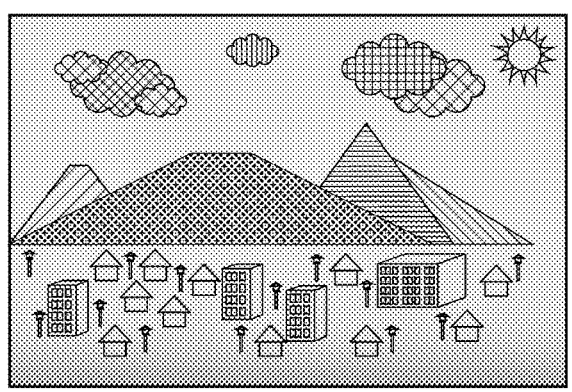

At step S902, the control unit 101 uses the image capturing unit 105 to capture a visible light image based on the exposure condition determined at step S901, and capture a plurality of infrared light images under the exposure condition determined at step S901 and an exposure condition in which the Tv is shortened with respect to the exposure condition determined at step S901. As an example of shortening the Tv (exposure time), the infrared light images are captured with the Tv changed, making the exposure to be −1 level and −2 level with respect to the exposure condition determined at step S901 as respectively illustrated in FIGS. 10C and 10D.

At step S903, the control unit 101 uses the synthesis processing unit 801 to synthesize the plurality of infrared light images, which have different exposures, captured at step S902. Although description of details of the synthesis method is omitted, a known HDR synthesis method, for example, is used. In this way, the region, which has been saturated in the infrared light image captured under the same exposure condition with the visible light image, is made not to be saturated, and thus a synthetic infrared light image with a high contrast can be generated.

Here, the enhancement process for the visible light image is similar to that in the first embodiment, and therefore description thereof will be omitted.

In the foregoing, a case where the infrared light image is partially saturated has been described as the second embodiment. As has been described above, the aforementioned embodiments allow for appropriately correcting a visible light image using an invisible light image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205464, filed Dec. 17, 2021, which is hereby incorporated by reference herein in its entirety.

What is claimed is:

1. An image capturing apparatus comprising:
at least one processor or circuit configured to function as:
a determination unit configured to determine an exposure in order to capture a visible light image and an invisible light image;
an image capturing unit configured to capture a visible light image and a plurality of invisible light images with an exposure determined by the determination unit, wherein the plurality of invisible light images are captured using a same filter;
a synthesis unit configured to synthesize the plurality of invisible light images and generate a synthetic invisible light image; and
a correction unit configured to correct the visible light image using the synthetic invisible light image;
wherein the determination unit determines a number of the invisible light images to be captured such that a noise amount in the synthetic invisible light image becomes comparable to a noise amount in the visible light image.

2. The image capturing apparatus according to claim 1, wherein the at least one processor or circuit is configured to further function as
a brightness adjustment unit configured to adjust the brightness of the plurality of invisible light images.

3. The image capturing apparatus according to claim 2, wherein the synthesis unit synthesizes the plurality of invisible light images, whose brightness has been adjusted by the brightness adjustment unit, and generates the synthetic invisible light image.

4. The image capturing apparatus according to claim 3, wherein the brightness adjustment unit adjusts brightness of the plurality of invisible light images such that the brightness of the synthetic invisible light image matches the brightness of the visible light image.

5. The image capturing apparatus according to claim 1, wherein the determination unit differentiates the exposures of the plurality of invisible light images when saturation of the invisible light images is equal to or higher than a predetermined degree.

6. The image capturing apparatus according to claim 1, wherein the determination unit shortens the exposure time of the plurality of invisible light images when saturation of the invisible light image is equal to or higher than a predetermined degree.

7. The image capturing apparatus according to claim 1, wherein the at least one processor or circuit is configured to further function as
a region determination unit configured to determine a region, in the visible light image, to be corrected using the synthetic invisible light image.

8. The image capturing apparatus according to claim 7, wherein the region determination unit determines a region, as the region to be corrected, in which gradations of the visible light image is less than gradations of the synthetic invisible light image, and a difference between the gradations of the visible light image and the gradations of the synthetic invisible light image is larger than a predetermined value.

9. The image capturing apparatus according to claim 7, wherein the region determination unit determines the region to be corrected according to an instruction from a user.

10. The image capturing apparatus according to claim 1, wherein the at least one processor or circuit is configured to further function as
a recording unit configured to record the visible light image, and also record at least the plurality of invisible light images or the synthetic invisible light image or both.

11. The image capturing apparatus according to claim 1, wherein the invisible light image is an infrared light image.

12. The image capturing apparatus according to claim 1, wherein the correction unit performs an enhancement process as a process for correcting the visible light image.

13. A method of controlling an image capturing apparatus comprising:
determining an exposure in order to capture a visible light image and an invisible light image;
capturing a visible light image and a plurality of invisible light images with an exposure determined in the determining, wherein the plurality of invisible light images are captured using a same filter;
synthesizing the plurality of invisible light images and generating a synthetic invisible light image;
correcting the visible light image using the synthetic invisible light image; and
determining a number of the invisible light images to be captured such that a noise amount in the synthetic invisible light image becomes comparable to a noise amount in the visible light image.

14. A non-transitory computer-readable storage medium storing a program for causing a computer to function as respective units of an image capturing apparatus, the image capturing apparatus comprising:
a determination unit configured to determine an exposure in order to capture a visible light image and an invisible light image;
an image capturing unit configured to capture a visible light image and a plurality of invisible light images with an exposure determined by the determination unit, wherein the plurality of invisible light images are captured using a same filter;
a synthesis unit configured to synthesize the plurality of invisible light images and generate a synthetic invisible light image; and
a correction unit configured to correct the visible light image using the synthetic invisible light image,
wherein the determination unit determines a number of the invisible light images to be captured such that a noise amount in the synthetic invisible light image becomes comparable to a noise amount in the visible light image.

15. An image capturing apparatus comprising:
at least one processor or circuit configured to function as:
a determination unit configured to determine an exposure in order to capture a visible light image and an invisible light image;
an image capturing unit configured to capture a visible light image and a plurality of invisible light images with an exposure determined by the determination unit, wherein the plurality of invisible light images are captured using a same filter;

a synthesis unit configured to synthesize the plurality of invisible light images and generate a synthetic invisible light image; and a correction unit configured to correct the visible light image using the synthetic invisible light image, wherein the determination unit differentiates the exposures of the plurality of invisible light images when saturation of the invisible light images is equal to or higher than a predetermined degree.

16. An image capturing apparatus comprising:

at least one processor or circuit configured to function as:

a determination unit configured to determine an exposure in order to capture a visible light image and an invisible light image;

an image capturing unit configured to capture a visible light image and a plurality of invisible light images with an exposure determined by the determination unit, wherein the plurality of invisible light images are captured using a same filter;

a synthesis unit configured to synthesize the plurality of invisible light images and generate a synthetic invisible light image; and a correction unit configured to correct the visible light image using the synthetic invisible light image, wherein the determination unit shortens the exposure time of the plurality of invisible light images when saturation of the invisible light image is equal to or higher than a predetermined degree.

* * * * *